United States Patent
Prendergast

(10) Patent No.: US 8,519,722 B1
(45) Date of Patent: Aug. 27, 2013

(54) METHOD AND APPARATUS FOR TESTING PROJECTED CAPACITANCE MATRICES AND DETERMINING THE LOCATION AND TYPES OF FAULTS

(75) Inventor: Patrick Prendergast, Clinton, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 528 days.

(21) Appl. No.: 12/604,380

(22) Filed: Oct. 22, 2009

Related U.S. Application Data

(60) Provisional application No. 61/107,620, filed on Oct. 22, 2008.

(51) Int. Cl.
*G01R 27/26* (2006.01)
*G06F 3/041* (2006.01)

(52) U.S. Cl.
USPC ............................. 324/658; 324/690; 345/173

(58) Field of Classification Search
USPC ................... 324/548, 601, 658–690; 702/104
See application file for complete search history.

(56) References Cited

U.S. PATENT DOCUMENTS

| | | | |
|---|---|---|---|
| 5,335,230 A | 8/1994 | Crooks et al. | |
| 5,940,065 A | 8/1999 | Babb et al. | |
| 6,452,427 B1* | 9/2002 | Ko et al. | 327/101 |
| 6,753,853 B1 | 6/2004 | Dotson | |
| 6,930,494 B2* | 8/2005 | Tesdahl et al. | 324/690 |
| 6,977,646 B1 | 12/2005 | Hauck et al. | |
| 7,158,122 B2 | 1/2007 | Roberts | |
| 7,236,161 B2* | 6/2007 | Geaghan et al. | 345/173 |
| 7,567,240 B2 | 7/2009 | Peterson, Jr. et al. | |
| 2007/0024584 A1 | 2/2007 | Wong et al. | |
| 2007/0170931 A1* | 7/2007 | Snyder | 324/658 |
| 2008/0278453 A1* | 11/2008 | Reynolds et al. | 345/173 |
| 2009/0322410 A1* | 12/2009 | David et al. | 327/517 |

FOREIGN PATENT DOCUMENTS

JP 2005235002 A2 9/2005

* cited by examiner

*Primary Examiner* — Jermele M Hollington
*Assistant Examiner* — Farhana Hoque

(57) ABSTRACT

A method, system and apparatus is described for measuring a sensor, comparing measured values of a sensor to a reference value, adjusting a calibration parameter in response to the comparing of measured values to a reference value and determining sensor integrity based on the value o the adjusted parameter.

21 Claims, 17 Drawing Sheets

METHOD AND APPARATUS FOR TESTING PROJECTED CAPACITANCE MATRICES AND DETERMINING THE LOCATION AND TYPES OF FAULTS

CROSS-REFERENCE TO RELATED APPLICATION

This application claims the benefit of U.S. Provisional Patent Application No. 61/107,620 filed Oct. 22, 2008.

TECHNICAL FIELD

The present disclosure relates generally to touch sensors and, more particularly, to capacitive touch sensors.

BACKGROUND

Capacitive touch sensors are susceptible to manufacturing defects, wear and breakage over the life of the end product. Changes in the capacitive properties of a panel from those used during development or over the life of the project can impair performance or create a defective interface. Previous methods for determining the manufacturing quality of a capacitive touch panel included optically scanning the panel for defects and physically, mechanically engaging the panel. Mechanical detection of defects is low and requires precision robotic test equipment. Optical scanning is prone to mistakes and good panels can be rejected as falsely defective and defective panels can be falsely passed as good.

Other fault detection methods rely on external circuitry, mechanical test structures and different methods relative to the sensing method to determine and locate faults. Such methods increase system complexity and add additional failure mechanisms in the system test, which decreases reliability of the tests and increases costs for production through decreased yield.

BRIEF DESCRIPTION OF THE DRAWINGS

Embodiments are illustrated by way of example and are not intended to be limited by the figures of the accompanying drawings, in which like references indicate similar elements and in which.

DETAILED DESCRIPTION

In the following description, for purposes of explanation, numerous specific details are set forth in order to provide a thorough understanding of embodiments of the present invention. It will be evident, however, to one skilled in the art that the embodiments may be practiced without these specific details. In other instances, well-known circuits, structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Touch panel fault detection circuits and method are described. Fault detection can be run as part of the manufacturing process or during operation of the touch panel in response to a command from and external controller, based on timing, start up or in response to detected trauma to the touch panel.

Figure 1:
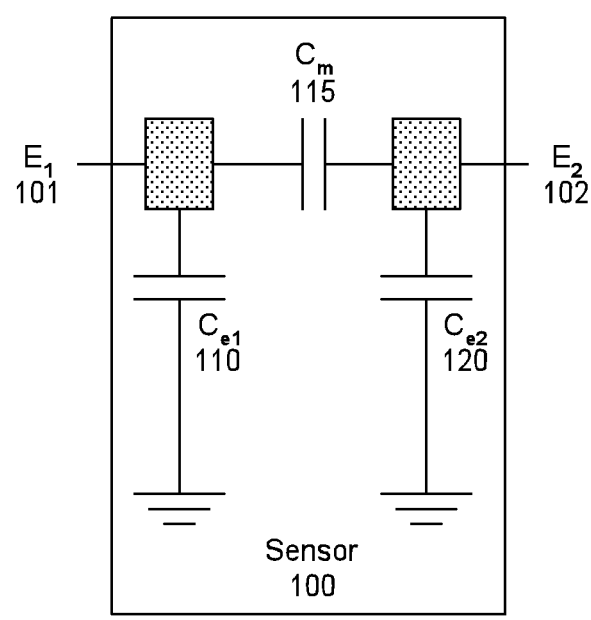
FIG. 1 illustrates a mutual capacitance sensor according to an embodiment.

Embodiments of the present invention allow for the determination of faults in a measurement circuit for the mutual capacitance of two or more electrodes. Capacitance measurement can be performed with a single pair of electrodes or with the use of a multiple electrode system. FIG. 1 shows a capacitive sensor 100 comprising a single pair of electrodes $E_1$ 101 and $E_2$ 102 situated close to each other. Electrodes $E_1$ 101 and $E_2$ 102 have self capacitances to a voltage potential $C_{e1}$ 110 and $C_{e1}$ 120, respectively. The voltage potential to which the self capacitance are may be ground. Electrodes $E_1$ 101 and $E_2$ 102 have a mutual capacitance $C_m$ 115 between them.

Figure 2:
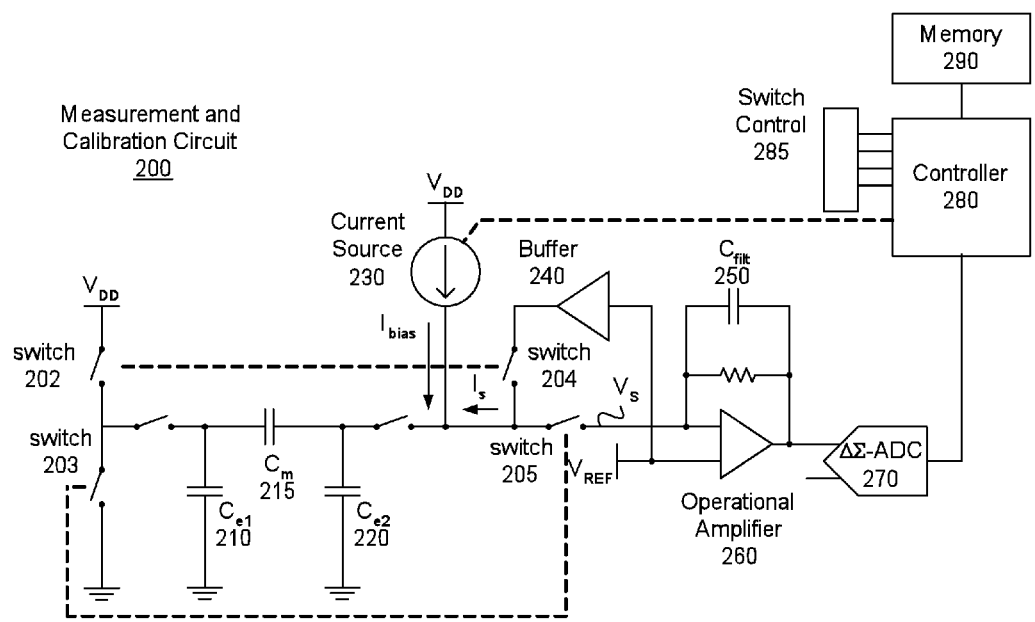
FIG. 2 illustrates a block diagram of the panel sensing and self-test circuit according to an embodiment.

There are various circuit implementations that may be used for performing capacitance measurement. FIG. 2 illustrates a single mutual capacitance measurement circuit 200 to measure $C_m$ 215.

The operation of the circuit may be described in several stages, which are repeated in sequence. Table 1 includes the switching sequence of switches for the circuits shown in FIG. 2.

Table 1: Switching sequence of switches and the voltages across capacitors $C_m$ 215, $C_{filt}$ 250, $C_{e1}$ 210 and $C_{e2}$ 220 shown in FIG. 2.

TABLE 1

Switching sequence of switches and the voltages across capacitors
$C_m$ 215, $C_{filt}$ 250, $C_{e1}$ 210 and $C_{e2}$ 220 shown in FIG. 2.

| Stage | Switch 202 | Switch 203 | Switch 204 | Switch 205 | $V_{Cfilt}$, $V_{Ce1}$, $V_{Ce2}$, $V_{Cm}$ |
|---|---|---|---|---|---|
| 1 | OFF | OFF | OFF | OFF | $V_{Cint} = V_0$ |
| 2 | ON | OFF | ON | OFF | $V_{Cm} = 0$, $V_{Ce1} = V_{Ce2} = V_{Cint} = V_{buf}$ |
| 3 | OFF | OFF | OFF | OFF | $V_{Cm} = 0$, $V_{Ce1} = V_{Ce2} = V_{Cint}$ |
| 4 | OFF | ON | OFF | ON | $V_{Cm} = V_{Cint} = V_{Ce1}$, $V_{Ce2} = 0$ |
| 5 | OFF | OFF | OFF | OFF | $V_{Cm} = V_{Ce1}$, $V_{Ce2} = 0$ |

FIG. 2 illustrates one embodiment of a capacitance measurement circuit 200 built around an operational amplifier 260. The capacitance measurement circuit of FIG. 2 also functions as a low pass filter (LPF) due to the presence of the filter capacitor $C_{filt}$ 250 in the amplified feedback path. The output voltage $V_S$ is proportional to the input current $I_S$. The circuit of FIG. 2 operates continuously such that ADC conversion can be started any time after transient signals have stabilized. It should be noted that the buffer input for buffer 240 can be connected to $V_{ref}$ for the circuit illustrated in FIG. 2, taking into account that both operational amplifier 260 inputs have approximately the same potential.

FIG. 2 further illustrates parasitic mutual capacitance current compensation using a programmable current source 230 as a programmable current offset in the capacitance measurement circuit 200 according to one embodiment. The current output of programmable current source 230 is a calibration parameter that is used to detect the sensor integrity arising from the physical characteristics of the sensor. The physical characteristics of a sensor are derived from the manufacturing process or trauma that may affect the operation of the sensor during its life.

Figure 3:
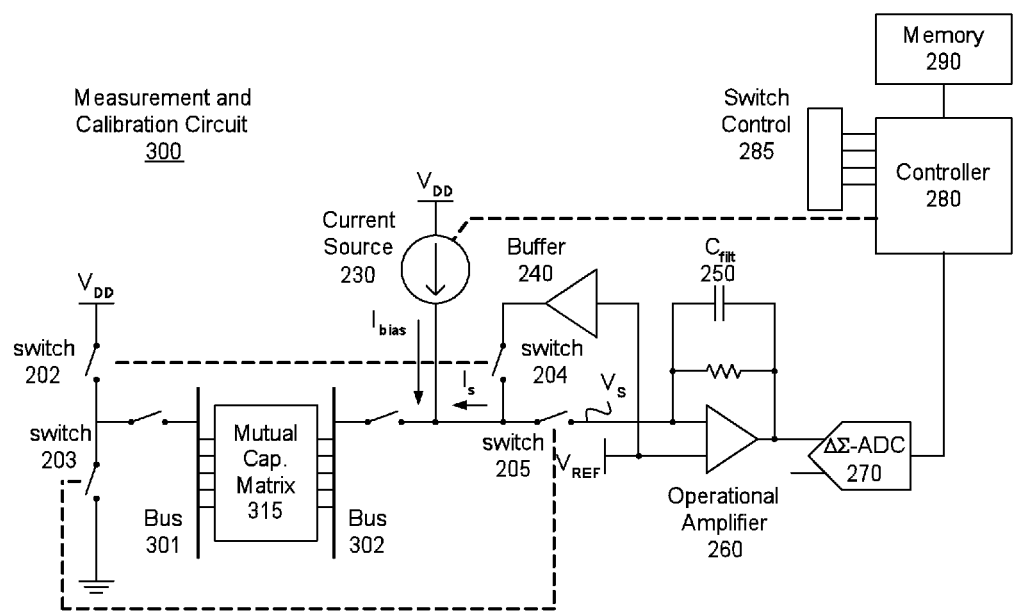
FIG. 3 illustrates a block diagram of the panel sensing and self-test circuit including a mutual capacitance matrix according an embodiment.

The measurement circuit 300 of FIG. 3 is configured to measure a mutual capacitance matrix 315 that is coupled to the measurement circuit 300 through buses 301 and 302.

Figure 4:
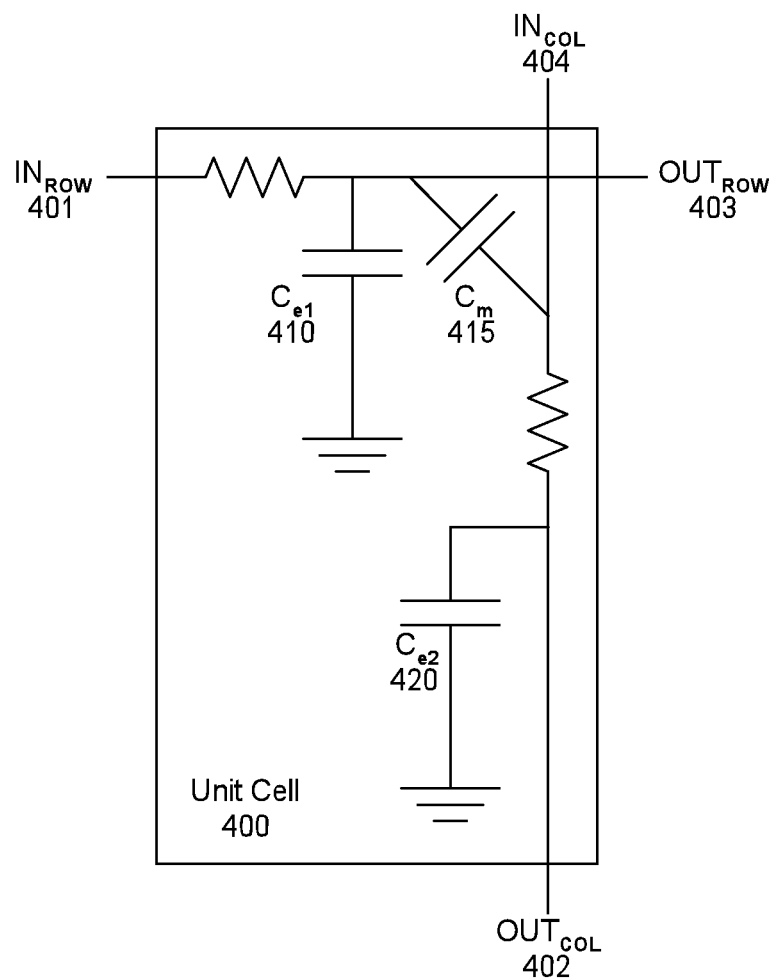
FIG. 4 illustrates a unit cell of a mutual capacitance sensor according to an embodiment.

The circuit of FIG. 3 measures a matrix 315 of mutual capacitances, which can each be represented by $C_m$ 415 in the unit cell 400 of FIG. 4. A mutual capacitance $C_m$ 415 exists between row and column conductors $C_{e1}$ 410 and $C_{e1}$ 420, respectively. $IN_{ROW}$ 401, $IN_{COL}$ 404, $OUT_{ROW}$ 403 and $OUT_{COL}$ 402 are coupled to other unit cells in the matrix. For example, an $OUT_{ROW}$ of a first unit cell is coupled to an $IN_{ROW}$ of a horizontally adjacent unit cell and an $OUT_{COL}$ is coupled to an $IN_{COL}$ of a vertically adjacent unit cell.

Figure 5:
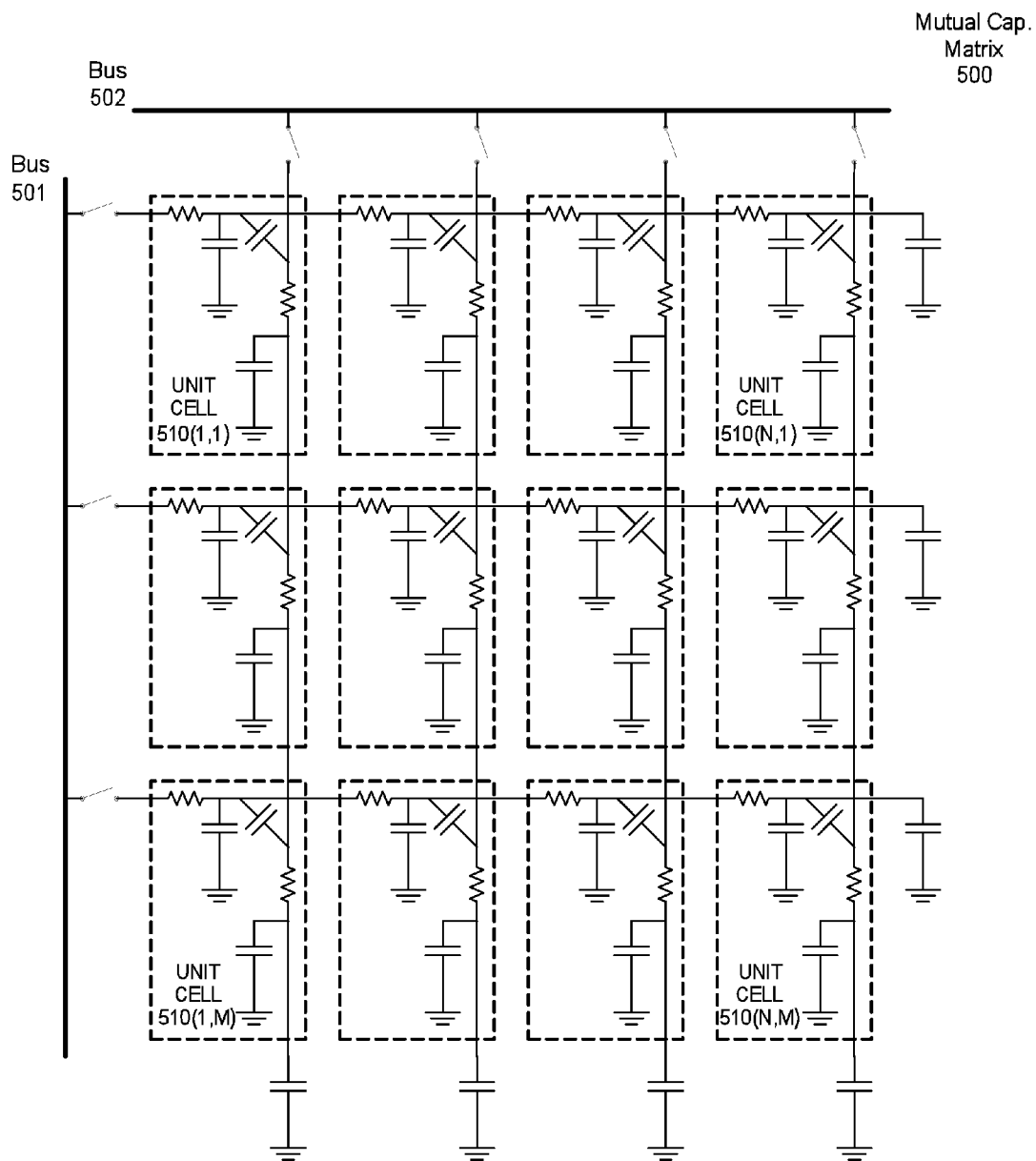
FIG. 5 illustrates a matrix of unit cells according to an embodiment.

A matrix of unit cells such as unit cell 400 illustrated in FIG. 4 is illustrated in FIG. 5. The unit cells 510(1,1) through 510(N,M) of FIG. 5 are arranged in an N×M mutual capacitance matrix 500, wherein the inputs of each row are coupled to a first bus 501 and the inputs of each column are coupled to a second bus 502. The outputs of each row and column have a capacitance to ground.

The measurement circuit of FIGS. 2 through 5 is used to calibrate and determine the type and location of faults in the mutual capacitance matrix 315. The method for initializing and executing the Built-In Self-Test (BIST) is shown in FIG. 6 through 8.

Figure 6:
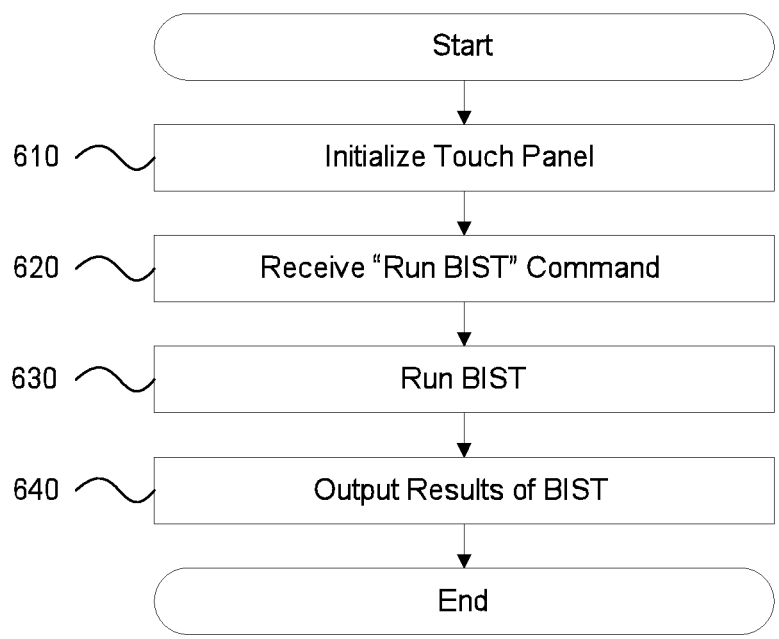
FIG. 6 illustrates a flowchart for the program operation according to the present invention.

FIG. 6 illustrates a flowchart for the initialization and execution of the BIST. First, the touchpad is initialized in block 610. After the touch panel is initialized the panel receives a "run BIST" command in block 620. The "run BIST" command can come from an external controller or can be set as a command based on a timer. In one embodiment, the "run BIST" command of block 620 can result from a manufacturing process command to identify defective touch panels before they are assembled into finished units. In another embodiment, the "run BIST" command of block 620 can be set to a timer and repeated at an interval to maintain the calibration parameters and perform an automated self-diagnostic of the touch panel. In another embodiment, the "run BIST" command of block 620 can be sent to the touch panel in response to a trauma to the device. A trauma may be that the device was dropped. In such a case, a diagnostic of the touch panel may identify a fault caused by the trauma and alert the user that the device has diminished performance and requires service. The embodiments described here are not meant to be an exhaustive list of situations in which a "run BIST" command may be sent to the touch panel. Rather, they are merely examples of the situations for which a "run BIST" command would be appropriate. The BIST routine is run in block 630 and the results of the BIST are output in block 640.

Figure 7:
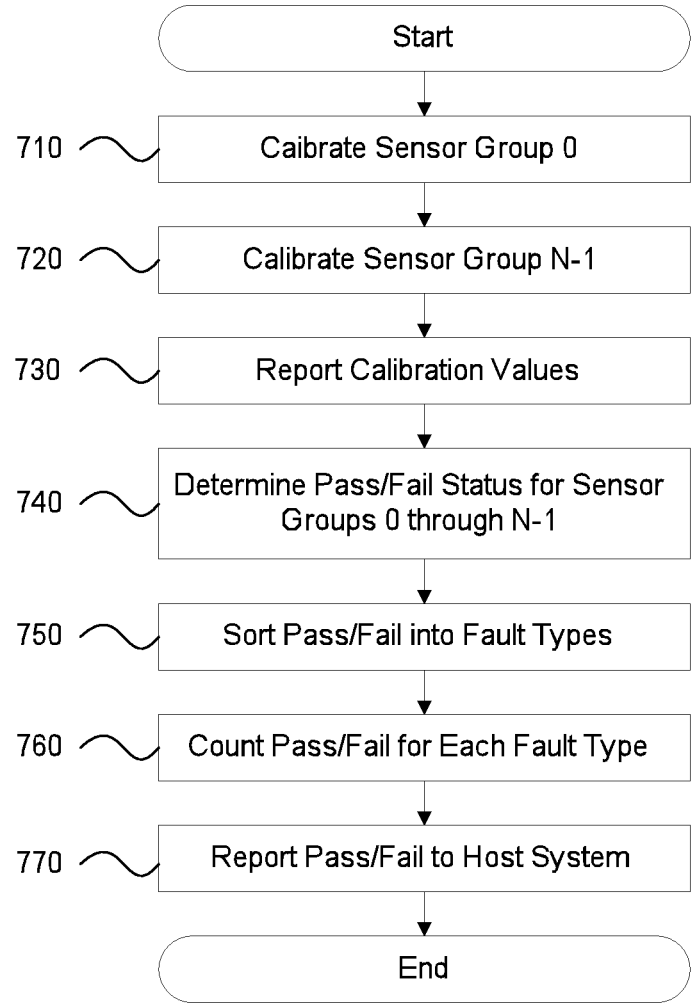
FIG. 7 illustrates a flowchart for the Built-In Self-Test (BIST) according to an embodiment.

FIG. 7 illustrates a flowchart for the calibration of sensors or sensor groups and the fault detection routine as it is integrated into the BIST. The first sensor is calibrated in block 710. The calibration step is then repeated for the remaining sensors in block 720. Block 720 is intended to be indicative of the repeatedly calibrating all sensors. Calibration values for sensor groups are reported in block 730. The Pass/Fail status for each sensor group is determined in block 740 and the failed sensor groups are sorted into fault types in block 750. The number of faults in each fault type is counted in block 760. Pass/Fail information, both the type and number, is sent to a host (FIG. 11, 1180) in block 770.

Figure 8:
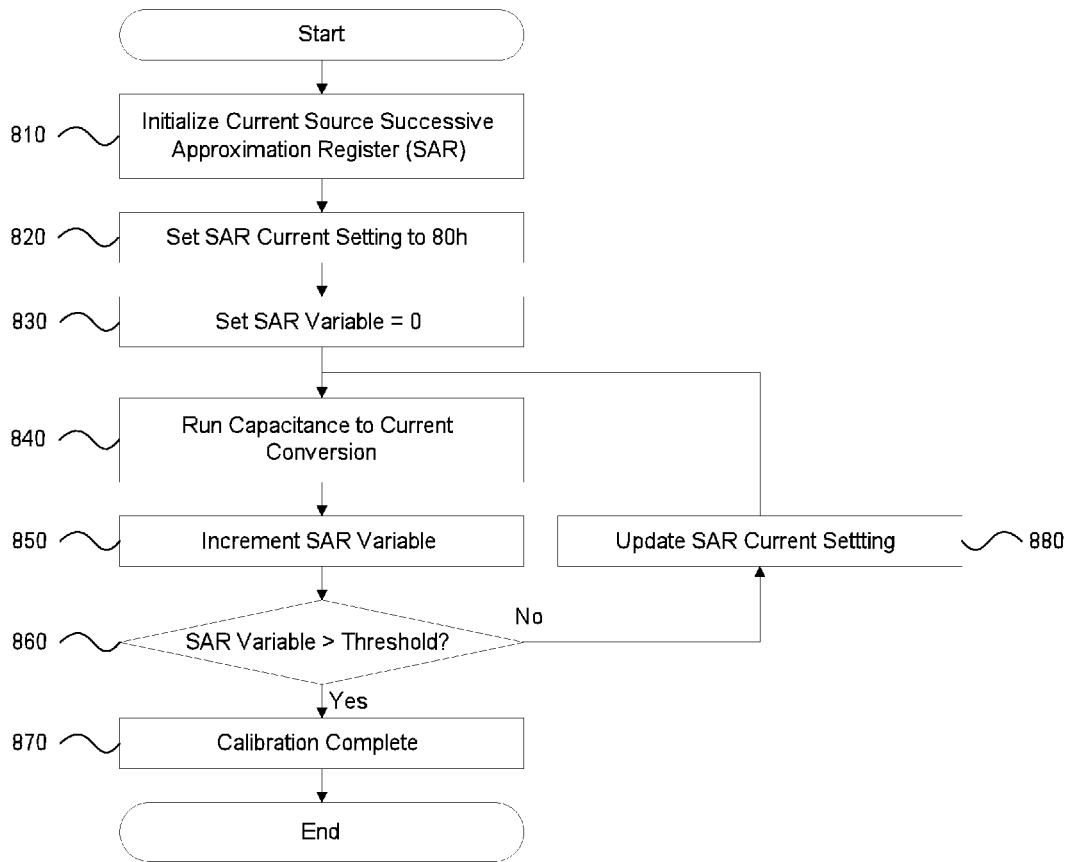
FIG. 8 illustrates a flowchart for the calibration routine for the Built-In Self-Test (BIST) according to an embodiment.

FIG. 8 illustrates a flowchart for one embodiment of the calibration routine according to the present invention. The current source successive approximation register (SAR) is initialized in block 810. The SAR current setting is set to an initial value of 80h in block 820. The SAR count variable is set to 0 in block 830. The SAR count variable (and the threshold for it) defines how many times the SAR routine is run during calibration. The capacitance measurement conversion is run according to Table 1 in block 840. In block 850 the SAR variable is incremented. In decision block 860, the SAR Variable is compared to a threshold. If the SAR variable is greater than the threshold, the calibration routine is complete and the SAR value is stored in block 870. If the SAR variable is less than the threshold, the SAR current setting is updated in block 880 and the capacitance measurement circuit is run again in block 840.

Figure 9A:
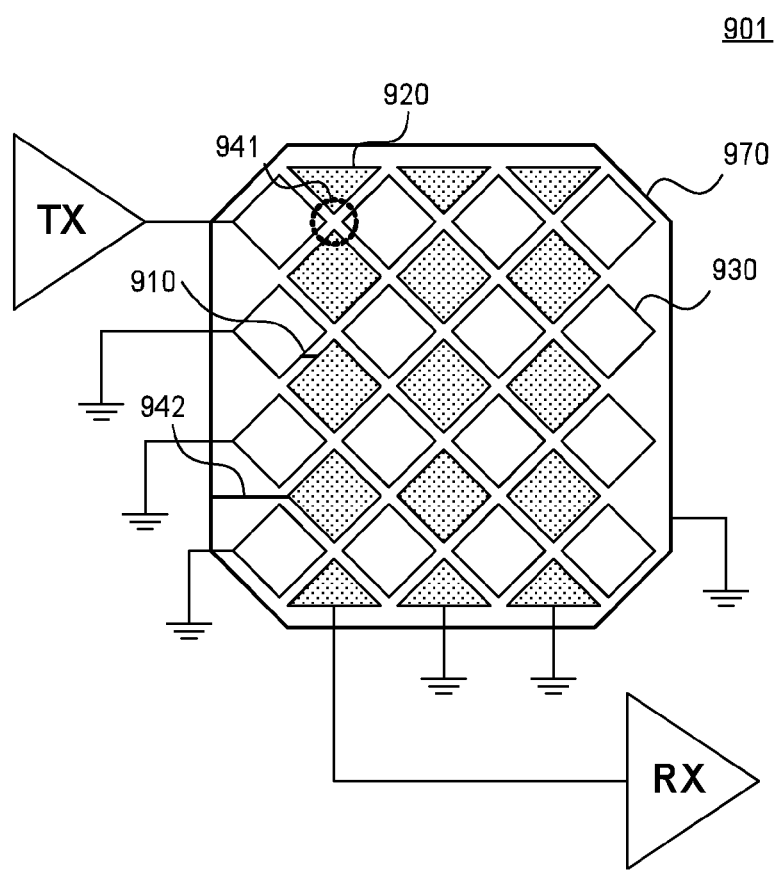
FIG. 9A illustrates a first fault type detectable by an embodiment.

FIGS. 9A through 9D illustrate possible fault types for a mutual capacitance touch panel 900 according to the embodiments. In an embodiment, each of the intersections of all row and column electrodes are measured, but for the purposes of clarity, only a single point of measurement is shown in the figures. FIG. 9A illustrates a first fault type wherein there exists a short 910 between the measured column electrode 920 and either a row electrode 930 that is not part of the measured pixel 941 and is therefore coupled to ground or a shield layer (not shown). A short 910 to the row electrode 930 that is not part of the measured pixel 941 or a short 942 to a shield electrode 970, wherein the shield 970 is grounded, will act as a resistive ground connection, since the row electrode is grounded when it is not coupled to the receive circuit 905. The output voltage $V_s$ 225, therefore cannot be trimmed to a normal level and the maximum output value is recorded.

Table 2 shows the pixel current source calibration values for a 16×11 array with a short to ground fault as shown in FIG. 9A.

TABLE 2

| FE | FE | FE | FE | FE | FE | FE | 00 | FE | FE | FE | FE | FE | FE | FE | FE |
|----|----|----|----|----|----|----|----|----|----|----|----|----|----|----|----|
| FE | FE | FE | FE | FE | FE | FE | FE | FE | FE | FE | FE | FE | FE | FE | 00 |
| 78 | 7A | 78 | 76 | 76 | 78 | 69 | 4F | 56 | 57 | 58 | 76 | 82 | 77 | 76 | 73 |
| 78 | 77 | 77 | 75 | 78 | 77 | 6B | 53 | 56 | 55 | 57 | 77 | 81 | 75 | 76 | 68 |
| 78 | 78 | 79 | 77 | 78 | 75 | 6A | 58 | 56 | 56 | 57 | 76 | 81 | 75 | 77 | 6A |
| 79 | 77 | 79 | 77 | 76 | 78 | 6A | 5E | 55 | 57 | 57 | 76 | 7F | 72 | 74 | 6A |
| 7B | 78 | 77 | 76 | 76 | 77 | 6C | 64 | 54 | 55 | 57 | 76 | 7D | 74 | 76 | 67 |
| 7C | 78 | 78 | 79 | 78 | 77 | 6E | 67 | 53 | 55 | 56 | 77 | 7F | 73 | 74 | 69 |
| 7C | 78 | 7B | 77 | 78 | 77 | 77 | 6C | 55 | 57 | 56 | 74 | 80 | 72 | 73 | 66 |
| FE | FE | FE | FE | FE | FE | 00 | FE | FE | FE | FE | FE | FE | FE | FE | FE |
| 90 | 85 | 83 | 7F | 80 | 7F | 8B | 7D | 58 | 59 | 59 | 7A | 83 | 76 | 78 | 6B |

Table 2 (as well as Tables 3 and 4) show an array of 16 columns and 11 rows. For the ease of explanation, FIGS. 9A through 9D illustrate only three columns and 4 rows. To illustrate a 16×11 matrix would be unnecessarily confusing. Tables 2 through 4 and FIGS. 9A through 9D are intended to be representative examples that do not necessary map directly to each other. Additionally, the values in each cell of Tables 2-4 indicate the programmable current source 230 necessary for the correct current offset.

Figure 10:
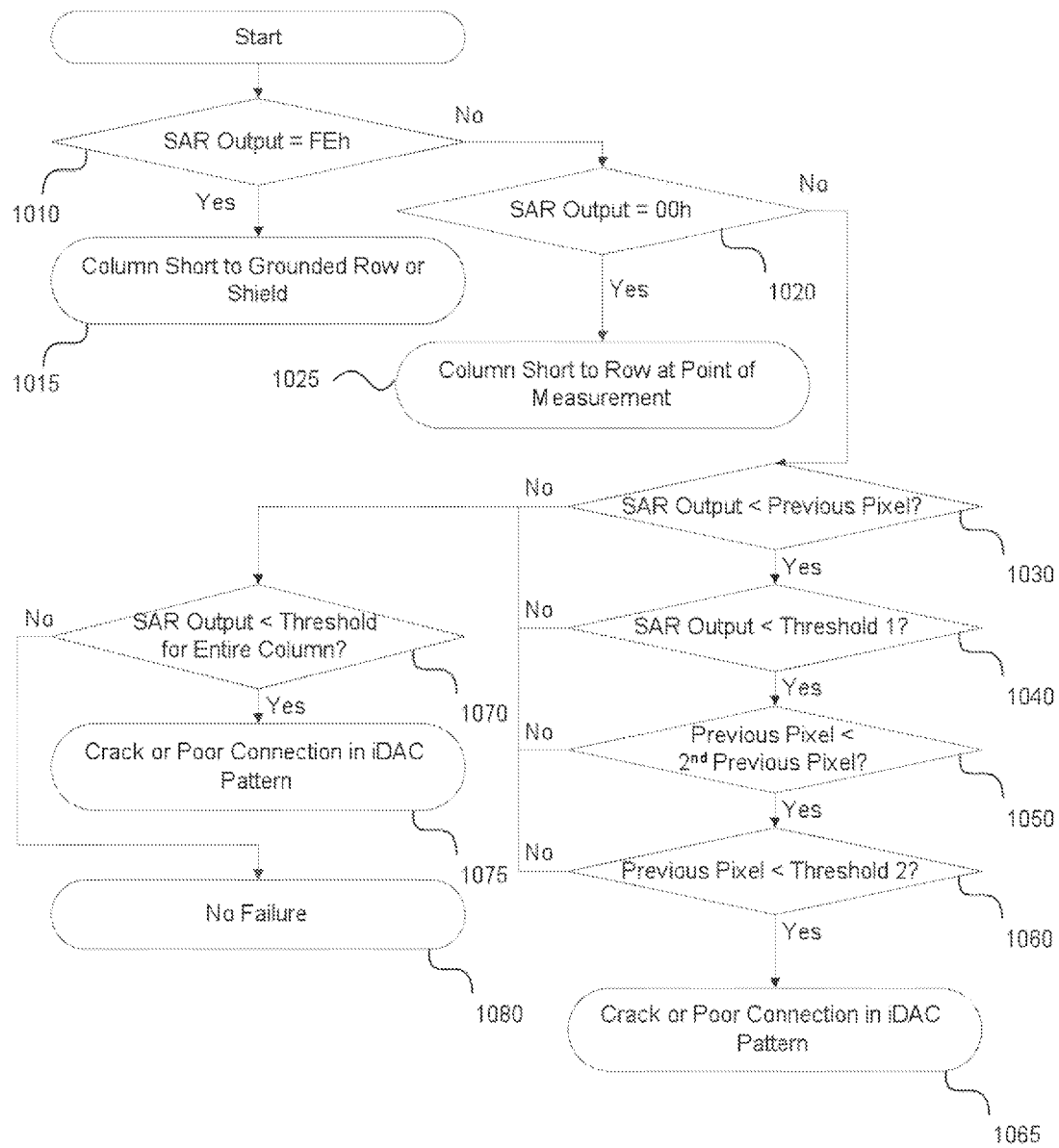
FIG. 10 illustrates a flowchart for the determination of fault types based on calibration successive approximation register (SAR) data according to an embodiment.

High output values of "FE" (254 in decimal) corresponding to the current offset from programmable current source 230 determined by controller 280 and stored in the memory 290 on three rows indicate that there is at least one short on three rows. These shorts are to either the shield layer 970 or a column since three rows show values of "FE." The method for this determination is shown in FIG. 10 and described below.

Figure 9B:
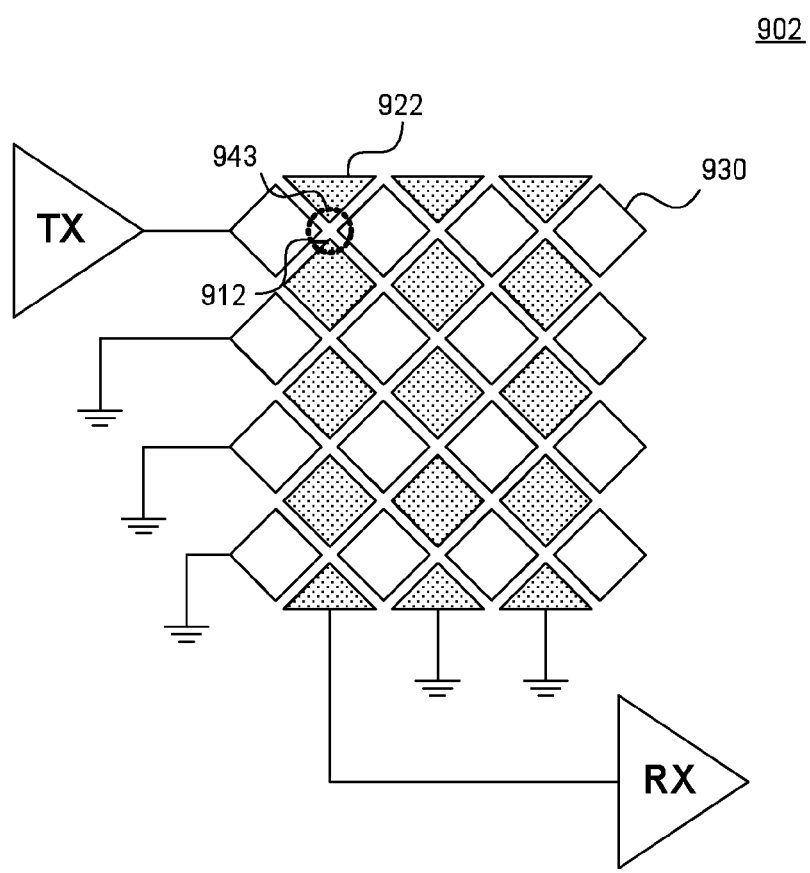
FIG. 9B illustrates a second fault type detectable by an embodiment.

FIG. 9B illustrates a second fault type wherein there exists a short 912 between the measured column electrode 920 and a row electrode 932 that is part of the measured pixel. A short 912 between the measured column electrode 922 and the row electrode 932 that is part of the measured pixel 943 prohibits the output voltage from reaching an expected level, keeping the current from the current source 230 of FIG. 2 negative or very low and the value for that pixel "00."

Table 3 shows the pixel current source calibration values for an array with a fault as shown in FIG. 9B.

TABLE 3

| FE | FE | FE | FE | FE | FE | FE | 00 | FE | FE | FE | FE | FE | FE | FE | FE |
|----|----|----|----|----|----|----|----|----|----|----|----|----|----|----|----|
| FE | FE | FE | FE | FE | FE | FE | FE | FE | FE | FE | FE | FE | FE | FE | 00 |
| 78 | 7A | 78 | 76 | 76 | 78 | 69 | 4F | 56 | 57 | 58 | 76 | 82 | 77 | 76 | 73 |
| 78 | 77 | 77 | 75 | 78 | 77 | 6B | 53 | 56 | 55 | 57 | 77 | 81 | 75 | 76 | 68 |
| 78 | 78 | 79 | 77 | 78 | 75 | 6A | 58 | 56 | 56 | 57 | 76 | 81 | 75 | 77 | 6A |
| 79 | 77 | 79 | 77 | 76 | 78 | 6A | 5E | 55 | 57 | 57 | 76 | 7F | 72 | 74 | 6A |
| 7B | 78 | 77 | 76 | 76 | 77 | 6C | 64 | 54 | 55 | 57 | 76 | 7D | 74 | 76 | 67 |
| 7C | 78 | 78 | 79 | 78 | 77 | 6E | 67 | 53 | 55 | 56 | 77 | 7F | 73 | 74 | 69 |
| 7C | 78 | 7B | 77 | 78 | 77 | 77 | 6C | 55 | 57 | 56 | 74 | 80 | 72 | 73 | 66 |
| FE | FE | FE | FE | FE | FE | 00 | FE | FE | FE | FE | FE | FE | FE | FE | FE |
| 90 | 85 | 83 | 7F | 80 | 7F | 8B | 7D | 58 | 59 | 59 | 7A | 83 | 76 | 78 | 6B |

Output values of "00" are detected for three pixels, indicating that there are three shorts between columns and rows, one each on rows 1, 2 and 10.

Figure 9C:
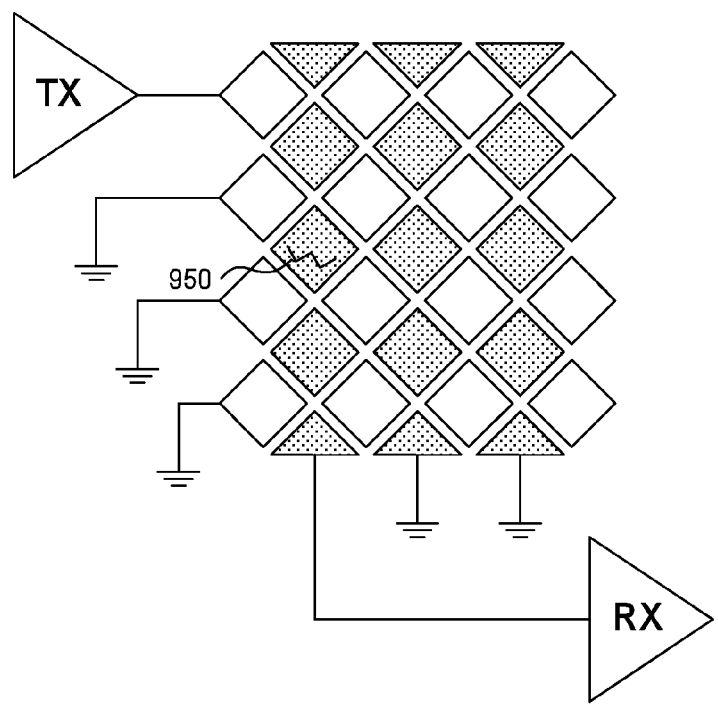
FIG. 9C illustrates a third fault type detectable by an embodiment.

FIG. 9C illustrates a third fault type wherein there is a crack in the mutual capacitance electrodes or a manufacturing defect in the touch panel interconnections. A crack in the electrodes or a manufacturing defect in the touch panel interconnections yields a correctly trimmed output voltage but low and diminishing sensitivity. The lower the current that is able to calibrate the output voltage is a product of lower conductivity and thus lower current through the electrodes, which can be the result of a crack in the metal bridges between sensing electrodes, breaks in the electrodes themselves or a bad etch in the patterning of the touch panel 903.

Table 4 shows the pixel current source calibration values for an array with a fault as shown in FIG. 9C.

TABLE 4

| 7D | 7D | 7E | 7D | 59 | 3D | 4A | 41 | 45 | 41 | 40 | 40 | 49 | 3E | 3F | 43 |
|----|----|----|----|----|----|----|----|----|----|----|----|----|----|----|----|
| 77 | 4E | 24 | 24 | 24 | 25 | 33 | 2A | 24 | 24 | 24 | 25 | 2F | 24 | 24 | 29 |
| 77 | 77 | 77 | 77 | 77 | 79 | 86 | 7D | 78 | 78 | 77 | 78 | 82 | 77 | 77 | 7B |
| 78 | 78 | 78 | 4A | 24 | 25 | 33 | 29 | 24 | 23 | 23 | 24 | 2E | 23 | 24 | 28 |
| 77 | 77 | 77 | 77 | 78 | 79 | 87 | 7D | 77 | 76 | 77 | 77 | 81 | 76 | 77 | 7A |
| 78 | 78 | 51 | 24 | 24 | 25 | 33 | 29 | 23 | 23 | 23 | 24 | 2E | 23 | 24 | 28 |
| 76 | 76 | 71 | 6E | 6E | 6E | 7A | 70 | 69 | 69 | 66 | 69 | 74 | 67 | 67 | 6D |
| 75 | 75 | 74 | 5A | 46 | 45 | 53 | 4A | 41 | 40 | 3F | 40 | 4A | 3E | 3F | 43 |
| 78 | 78 | 77 | 77 | 76 | 78 | 86 | 7E | 74 | 74 | 76 | 76 | 7F | 75 | 77 | 79 |
| 7C | 7B | 79 | 77 | 78 | 52 | 33 | 2A | 22 | 23 | 23 | 24 | 2E | 23 | 23 | 27 |
| 8F | 83 | 81 | 7C | 7C | 7E | 8E | 85 | 79 | 79 | 79 | 78 | 85 | 79 | 7A | 7B |

Diminishing output values are detected on five rows. In each case an expected value is detected, followed by a lower value and a still lower value in the third pixel. Thereafter, pixels have a lower output value indicating that the bad etch or crack in the IDAC pattern is located between the pixel 950 with the expected value and the first lower value. For example, in the second row, the fault lies between the first and second pixels. In the tenth row, the fault lies between the fifth and sixth pixels.

Figure 9D:
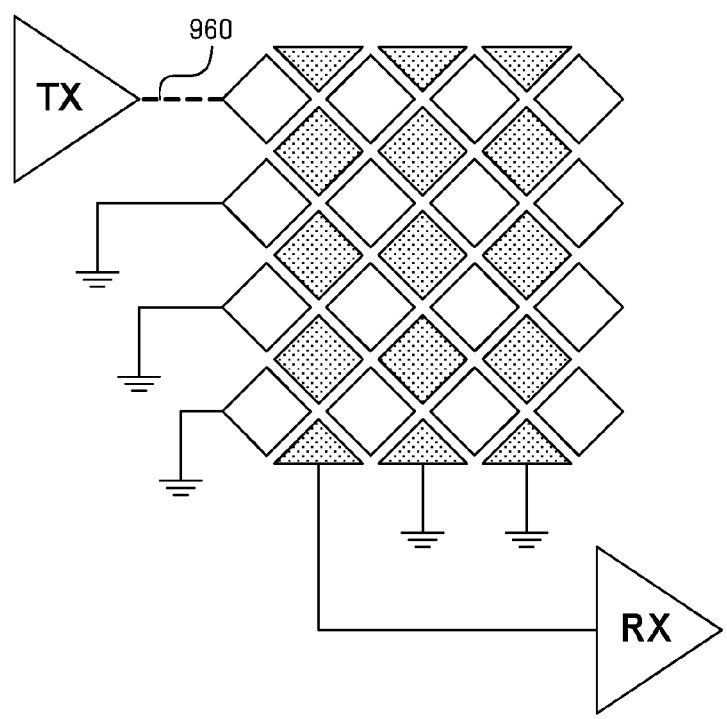
FIG. 9D illustrates a fourth fault type detectable by an embodiment.

FIG. 9D illustrates a fourth fault type wherein there is a crack or poor trace quality between the sensing circuitry and the touch panel 904 itself. In this embodiment the output voltage can be trimmed to a normal level but the sensitivity is low for an entire column due to the increased source impedance of the TX drive signal.

Table 5 shows the pixel current source calibration values for an array with a fault as shown in FIG. 9D.

TABLE 5

| 7D | 7D | 7E | 2A | 2C | 2C | 39 | 30 | 89 | 82 | 18 | 82 | 8C | 80 | 81 | 86 |
|----|----|----|----|----|----|----|----|----|----|----|----|----|----|----|----|
| 77 | 75 | 75 | 21 | 24 | 23 | 31 | 28 | 7B | 76 | 76 | 76 | 81 | 74 | 76 | 79 |
| 77 | 77 | 77 | 21 | 23 | 23 | 30 | 28 | 79 | 76 | 75 | 76 | 80 | 74 | 75 | 79 |
| 78 | 78 | 78 | 21 | 24 | 23 | 31 | 28 | 78 | 74 | 74 | 74 | 7F | 73 | 74 | 78 |
| 77 | 77 | 77 | 21 | 24 | 23 | 31 | 28 | 78 | 75 | 73 | 75 | 7E | 73 | 74 | 77 |
| 78 | 78 | 76 | 21 | 24 | 23 | 31 | 27 | 77 | 73 | 73 | 74 | 7D | 72 | 72 | 77 |
| 76 | 76 | 71 | 21 | 27 | 22 | 31 | 28 | 77 | 72 | 73 | 73 | 7C | 71 | 73 | 78 |
| 75 | 75 | 74 | 23 | 26 | 22 | 30 | 27 | 75 | 75 | 72 | 73 | 7D | 72 | 73 | 74 |
| 78 | 78 | 77 | 23 | 23 | 23 | 30 | 28 | 75 | 72 | 71 | 76 | 7C | 70 | 73 | 75 |
| 7C | 7B | 79 | 21 | 24 | 23 | 30 | 2A | 79 | 71 | 72 | 73 | 7C | 71 | 70 | 75 |
| 8F | 83 | 81 | 4E | 50 | 4F | 5A | 55 | 7A | 77 | 76 | 76 | 7F | 75 | 76 | 79 |

Low output values for entire columns indicate that there are bad connections for columns 4 through 8.

The four fault types illustrated in FIGS. 9A through 9D and exemplified in Tables 2 through 5 are distinguished from each other according to the method illustrated in FIG. 10. The SAR output is compared to a reference value indicating a high output in block 1010. In this embodiment, and 8-bit SAR is used and the high output value is set to 254 (FEh). In another embodiment, a different resolution of SAR can be used as well as a different high output value. If the SAR output is equal to FEh, it is determined that there is a short to a grounded row or to the shield electrode as shown in FIG. 9A and block 1015. If the SAR output does not equal FEh, the SAR output is compared to a low value of 0 (00h) in block 1020. If the SAR output is equal to 00h, it is determined that there is short to a between and column and a row at the point of measurement, as shown in FIG. 9B and block 1025. If the SAR output does not equal 00, it is compared to the previous pixel SAR output value in block 1030. If the SAR output for the measured pixel is less than the SAR output for the previous pixel it is then compared to a first threshold value in block 1040. If the SAR output value is less than the previous pixel and less than a first threshold, the previous pixel is compared to the pixel before it in block 1050. If the previous pixel is less than the pixel before it, the previous pixel is compared to a second threshold in block 1060. In the previous pixel is less than the pixel before it and the previous pixel is less than a second threshold value, it is determined in block 1065 that there is a crack or a poor connection in the touch panel 903. If any of steps 1030 through 1060 are "no," the SAR output for an entire column is compared to a third threshold in step 1070. If the SAR output for an entire column is less than the third threshold, it is determined in block 1075 that there is a crack or a poor connection in the connection between the sensing circuit and the touch panel 904 in FIG. 9. If the output of block 1070 is "no," the connection between the sensing circuit and the touch panel 901, 902, 903 or 904 is identified as having no failure in block 1080.

Figure 11A:
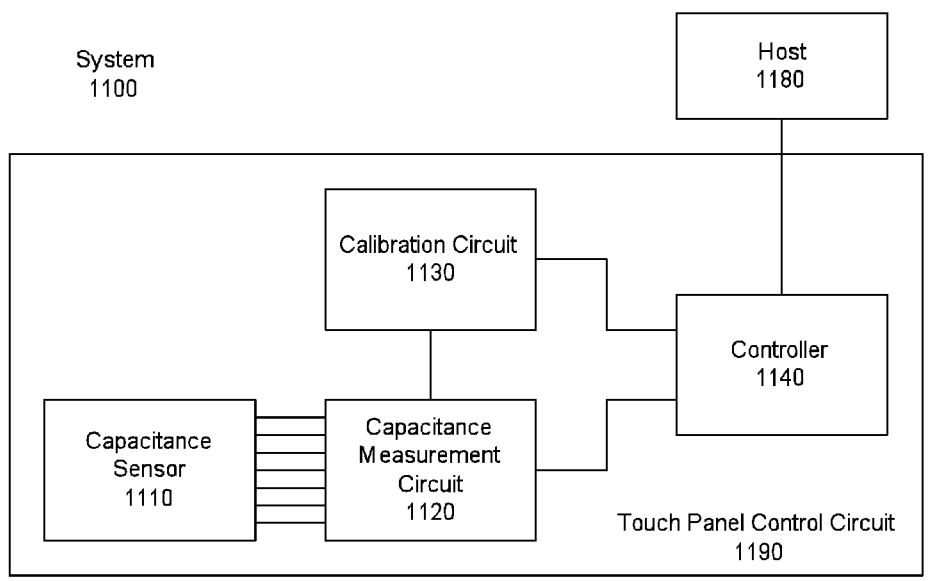
FIG. 11A illustrate a first system for measuring mutual capacitance according to an embodiment.

A system that executes this test process can have several configurations shown in FIGS. 11A through 11D. FIG. 11A illustrates an embodiment wherein the controller 1140 for this test process may be integrated into the touch panel control circuitry 1190. System 1100 comprises touchpanel control circuitry 1190 coupled to host 1180. Touch panel control circuitry 1190 includes capacitive sensor 1110 which is coupled to capacitance measurement circuit 1120. Capacitance measurement circuit 1120 is coupled to calibration circuit 1130. Controller 1140 is coupled to calibration circuit 1130 and capacitance measurement circuit 1120 and coupled to the host 1180.

Figure 11B:
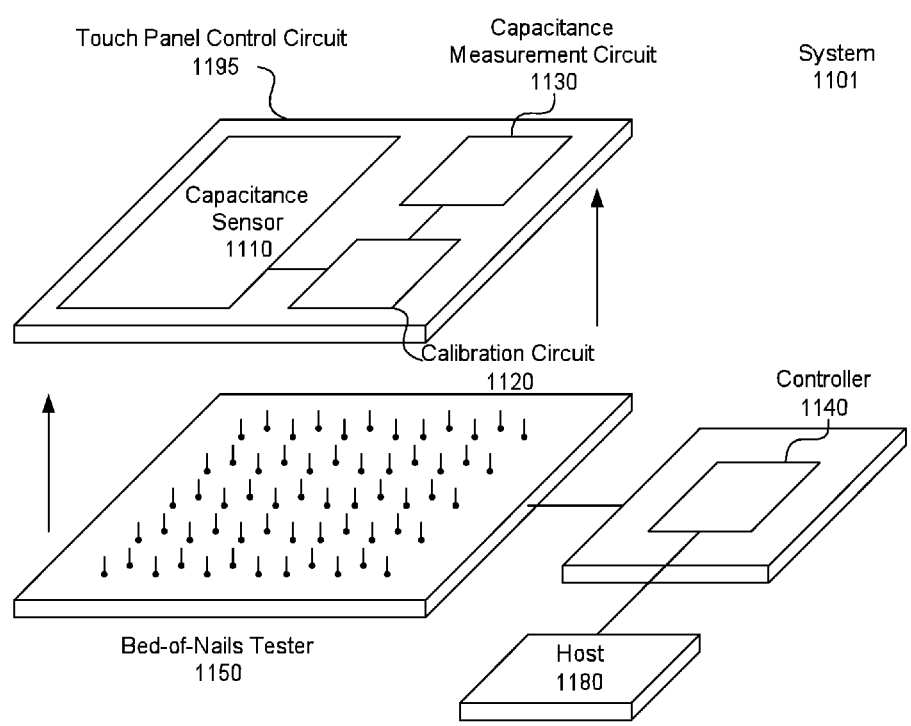
FIG. 11B illustrate a second system for measuring mutual capacitance according to an embodiment.

FIG. 11B illustrates an embodiment, system 1101, wherein the touch panel control circuit 1195 is coupled to the controller 1140 through a bed-of-nails tester 1150. The bed-of-nails tester 1150 couples the controller to appropriate locations on the touch panel control circuit 1195.

Figure 11C:
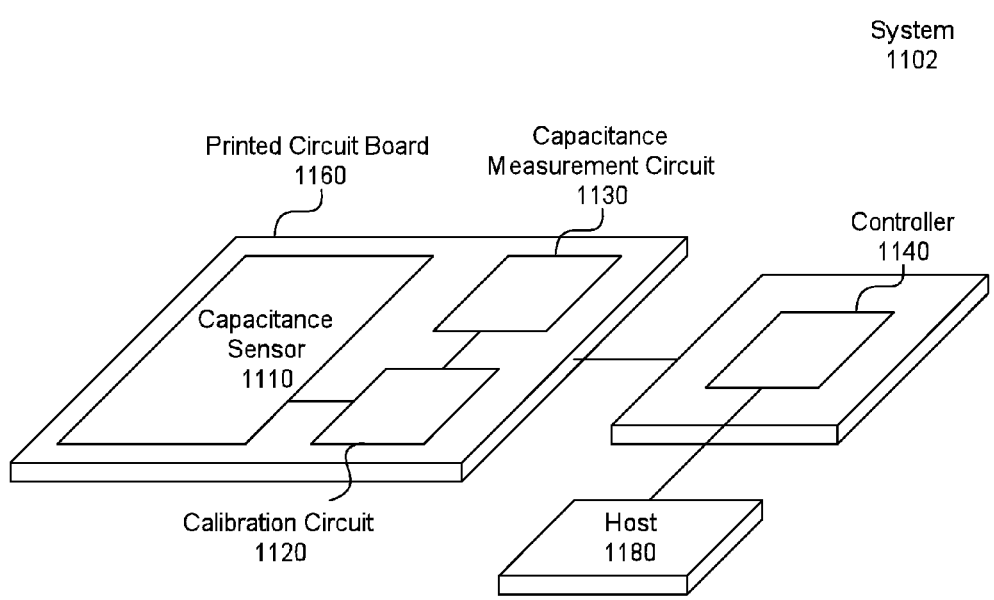
FIG. 11C illustrate a third system for measuring mutual capacitance according to an embodiment.

FIG. 11C illustrates an embodiment, system 1102, wherein the capacitance sensor 1110, calibration circuit 1130 and capacitance measurement circuit 1120 are located on a printed circuit board 1160. The controller 1140 is coupled to the printed circuit board 1160 and to the host 1180.

Figure 11D:
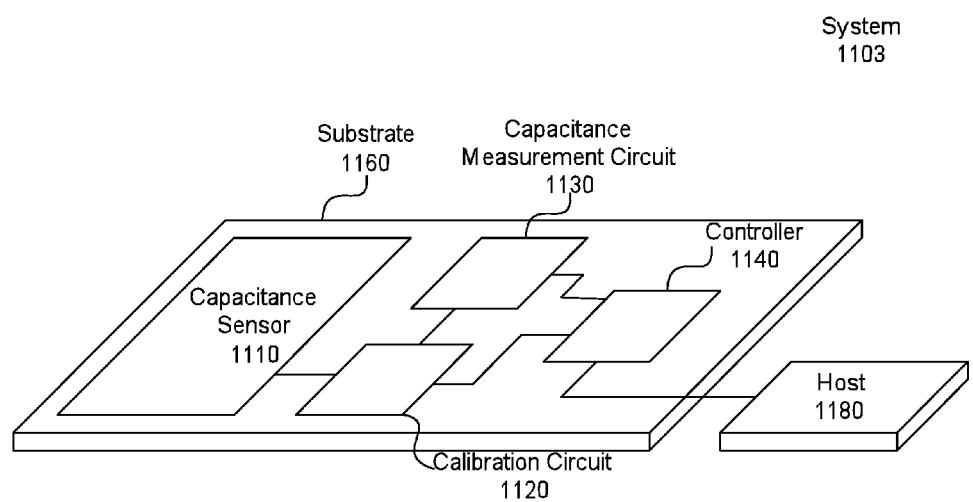
FIG. 11D illustrate a fourth system for measuring mutual capacitance according to an embodiment.

FIG. 11D illustrates an embodiment, system 1103, wherein the capacitance sensor 1110, capacitance measurement circuit, calibration circuit and controller are all located on the same substrate 1170 for the capacitance sensor.

Although the present invention has been described with reference to specific example embodiments, it will be evident that various modifications and changes may be made to these embodiments without departing from the broader spirit and scope of the invention as set forth in the claims. Accordingly, the specification and drawings are to be regarded in an illustrative rather than a restrictive sense. For example, the capacitance measurement circuit may perform a variety of well known and understood sensing methods, including charge transfer filtering, relaxation oscillator charging, differential charge sharing between multiple capacitors, and others.

In the foregoing specification, the invention has been described with reference to specific example embodiments thereof. The specification and drawings are, accordingly, to be regarded in an illustrative sense rather than a restrictive sense.

What is claimed is:

1. A method comprising:
    measuring a capacitance value of a sensor;
    comparing the measured capacitance values to a first reference value;
    adjusting a calibration parameter in response to comparing the measured capacitance value to the first reference value; and
    determining sensor integrity by comparing the value of the adjusted calibration parameter to one or more second reference values, wherein determining sensor integrity comprises identifying at least one of a plurality of fault conditions, and wherein each of the plurality of fault conditions is defined by at least one of the one or more second reference values.

2. The method of claim 1 wherein the sensor is a mutual capacitance sensor.

3. The method of claim 1, wherein measuring the capacitance value of the sensor comprises generating a current from the sensor.

4. The method of claim 3, wherein the calibration parameter is a setting for a programmable current source coupled to a circuit configured to perform measuring the capacitance value of the sensor.

5. The method of claim 1 wherein the plurality of fault conditions comprises a short between a first electrode and a second electrode.

6. The method of claim 5 wherein the first electrode receives a drive signal and the second electrode is coupled to a voltage potential.

7. The method of claim 6 wherein the voltage potential is ground.

8. The method of claim 5 herein the first electrode receives a drive signal and the second electrode is a shield layer coupled to a voltage potential.

9. The method of claim 8, wherein the voltage potential is ground.

10. The method of claim 5, wherein the first electrode receives a drive signal and the second electrode is configured to receive the drive signal from the first electrode and output a current.

11. The method of claim 1 wherein the plurality of fault conditions comprises a poor connection on either a first drive electrode or a second receive electrode.

12. The method of claim 1, wherein the plurality of fault conditions comprises a poor connection between the sensor and a circuit configured to measure capacitance.

13. An apparatus comprising:
    means for measuring a capacitance value of a sensor;
    means for comparing the measured capacitance values to a first reference value;
    means for adjusting a calibration parameter in response to comparing the measured capacitance value to the first reference value; and
    means for determining sensor integrity by comparing the value of the adjusted calibration parameter to one or more second reference values, wherein the means for determining sensor integrity identifies at least one of a plurality of fault conditions, and wherein each of the plurality of fault conditions is defined by at least one of the one or more second reference values.

14. The apparatus of claim 13 wherein the means for measuring the capacitance value comprises a capacitance-to-current conversion circuit.

15. The apparatus of claim 14 wherein the means for adjusting the calibration parameter comprises a programmable current source coupled to an output of the capacitance to current conversion circuit.

16. A system comprising:
    a capacitance sensor;
    a capacitance measurement circuit coupled with the capacitance sensor, the capacitance measurement circuit configured to measure a capacitance value of the capacitance sensor;

a calibration circuit coupled with the capacitance measurement circuit, the calibration circuit configured to adjust a calibration parameter based on the measured capacitance value and a first reference value; and a controller coupled with the capacitance measurement circuit and the calibration circuit and configured to compare the value of the adjusted calibration parameter to one or more second reference values in order to identify faults and fault types in the capacitance sensor, wherein the one or more second reference values define the faults and the fault types.

17. The system of claim 16 wherein the capacitance measurement circuit is a capacitance to current converter.

18. The system of claim 17 wherein the calibration circuit is a programmable current source coupled to the capacitance to current converter.

19. The system of claim 16, wherein the controller is coupled to the capacitance sensor through a bed of nails tester.

20. The system of claim 16, wherein the controller is coupled to the capacitance sensor through a printed circuit board.

21. The system of claim 16, wherein the controller is coupled to the capacitance sensor through direct bonding to a touch panel substrate.

* * * * *